United States Patent
Xu et al.

(10) Patent No.: US 11,626,834 B2
(45) Date of Patent: Apr. 11, 2023

(54) POWER BACKFEED CONTROL METHOD, CONVERTER, AND PHOTOVOLTAIC POWER GENERATION SYSTEM

(71) Applicant: Huawei Digital Power Technologies Co., Ltd., Shenzhen (CN)

(72) Inventors: Fei Xu, Shanghai (CN); Xinyu Yu, Shanghai (CN); Kai Xin, Shanghai (CN); Jianqiang Wang, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/553,385

(22) Filed: Dec. 16, 2021

(65) Prior Publication Data

US 2022/0109400 A1    Apr. 7, 2022

Related U.S. Application Data

(63) Continuation of application No. PCT/CN2020/100130, filed on Jul. 3, 2020.

(51) Int. Cl.
*H02S 40/32* (2014.01)
*H02M 7/537* (2006.01)
*H02J 3/38* (2006.01)

(52) U.S. Cl.
CPC .............. *H02S 40/32* (2014.12); *H02J 3/381* (2013.01); *H02M 7/537* (2013.01); *H02J 2300/26* (2020.01)

(58) Field of Classification Search
CPC .......... H02S 40/32; H02S 50/15; H02S 50/10; H02J 3/381; H02J 2300/26; H02M 7/537; Y02E 10/56
See application file for complete search history.

(56) References Cited

U.S. PATENT DOCUMENTS

2015/0107646 A1    4/2015    Fife et al.
2018/0006464 A1*   1/2018    Judkins ................... H02S 40/32

FOREIGN PATENT DOCUMENTS

| CN | 106684924 A | 5/2017 |
|---|---|---|
| CN | 107659266 A | 2/2018 |
| CN | 110277962 A | 9/2019 |
| CN | 110752825 A | 2/2020 |

(Continued)

*Primary Examiner* — Toan T Vu
(74) *Attorney, Agent, or Firm* — Leydig, Voit & Mayer, Ltd.

(57) ABSTRACT

A converter and a power backfeed control method applied to a photovoltaic power generation system are provided. The power backfeed control method includes: controlling, according to a backfeed instruction, the converter to enter a backfeed mode, where in the backfeed mode, the converter can transmit energy of the power grid to a selected photovoltaic string with a corresponding number; determining a backfeed control voltage according to the backfeed instruction, and determining a voltage limit in a process of determining the backfeed control voltage; determining an actual backfeed voltage based on the backfeed control voltage and the voltage limit, where the actual backfeed voltage is a smaller one of the backfeed control voltage and the voltage limit; and controlling the converter to output the actual backfeed voltage to the selected photovoltaic string, to enable the selected photovoltaic string to generate an electroluminescent effect.

20 Claims, 8 Drawing Sheets

(56) References Cited

FOREIGN PATENT DOCUMENTS

| CN | 110912514 A | | 3/2020 |
|----|-------------|---|--------|
| CN | 111262429 A | | 6/2020 |
| CN | 111262429 A | * | 9/2020 |
| JP | 2017060246 A | | 3/2017 |

* cited by examiner

POWER BACKFEED CONTROL METHOD, CONVERTER, AND PHOTOVOLTAIC POWER GENERATION SYSTEM

CROSS-REFERENCE TO RELATED APPLICATIONS

This application is a continuation of International Application No. PCT/CN2020/100130, filed on Jul. 3, 2020, the disclosure of which is hereby incorporated by reference in its entirety.

TECHNICAL FIELD

Embodiments of this application relate to the field of photovoltaic power generation technologies, and in particular, to a power backfeed control method, a converter, and a photovoltaic power generation system.

BACKGROUND

A photovoltaic module is a core part of a solar power generation system, and quality of the photovoltaic module directly determines a power generation capacity of the solar power generation system. Therefore, detection of a photovoltaic module in a solar power generation system is an essential process. A plurality of photovoltaic modules are combined in series and/or in parallel to form a photovoltaic string, and at least one photovoltaic string is connected to a direct current side input end of an inverter.

Currently, a common method for detecting a photovoltaic module in a solar power generation system is electroluminescent (EL) detection. To be specific, a backfeed current of the inverter is controlled to adjust luminous intensity of the photovoltaic module, and an image that is of the photovoltaic module and that is in a luminous state is collected and analyzed, to detect a disadvantage of the module.

However, due to complexity of a power station scenario, photovoltaic strings connected to the inverter usually have problems such as insufficient connection, missing connection, or a large parameter difference between the photovoltaic strings. Consequently, when the inverter is controlled to perform power backfeed on a single or plurality of photovoltaic strings, overcurrent protection may be frequently triggered due to an excessive current of another string. Therefore, overall detection efficiency is affected and a power loss is caused.

SUMMARY

Embodiments of this application disclose a power backfeed control method, a converter, and a photovoltaic power generation system that can avoid or reduce problems of low detection efficiency and a power loss that are caused by frequent triggering of overcurrent protection in a power backfeed control process, to improve detection efficiency of a photovoltaic module and reduce a power loss of the photovoltaic power generation system.

According to a first aspect, an embodiment of this application discloses a power backfeed control method for a photovoltaic module, applied to a converter. One end of the converter is connected to at least one photovoltaic string, and another end of the converter is connected to a power grid. Each photovoltaic string corresponds to one string number. The power backfeed control method includes: controlling, according to a backfeed instruction, the converter to enter a backfeed mode, where in the backfeed mode, the converter can transmit energy of the power grid to a selected photovoltaic string with a corresponding number; determining a backfeed control voltage according to the backfeed instruction, and determining a voltage limit in a process of determining the backfeed control voltage; determining an actual backfeed voltage based on the backfeed control voltage and the voltage limit, where the actual backfeed voltage is a smaller one of the backfeed control voltage and the voltage limit; and controlling the converter to output the actual backfeed voltage to the selected photovoltaic string, to enable the selected photovoltaic string to generate an electroluminescent effect.

According to the technical solution described in the first aspect, the voltage limit is further determined in the process of determining the backfeed control voltage, and the smaller one of the backfeed control voltage and the voltage limit is used as the actual backfeed voltage. In this way, problems of low detection efficiency and a power loss that are caused by frequent triggering of overcurrent protection due to an excessively high backfeed control voltage in a power backfeed control process can be avoided or reduced, to improve detection efficiency of the photovoltaic module and reduce a power loss of a photovoltaic power generation system.

According to the first aspect, in a possible implementation, the backfeed instruction includes a string number and a backfeed reference current. The determining a backfeed control voltage according to the backfeed instruction includes: controlling the converter to output a corresponding voltage to supply power to the photovoltaic string with the corresponding number; sampling a current of the photovoltaic string with the corresponding string number to obtain a feedback current; and calculating a difference between the feedback current and the backfeed reference current, and determining the backfeed control voltage by performing proportional integral calculation. In this way, after the current is periodically sampled, the backfeed control voltage is gradually determined by using the proportional integral operation, so that accuracy of a backfeed current may be ensured, and subsequent detection accuracy may be improved.

According to the first aspect, in a possible implementation, the backfeed instruction includes a string number and a backfeed reference voltage. The determining a backfeed control voltage according to the backfeed instruction includes: controlling the converter to output the backfeed reference voltage to supply power to the photovoltaic string with the corresponding number; adjusting the backfeed reference voltage based on definition of a luminous image of the photovoltaic string with the corresponding number until the definition of the luminous image meets a preset requirement; and determining that a backfeed reference voltage when the preset requirement is met is the backfeed control voltage. In this way, the backfeed control voltage is determined by using the definition of the image, so that the definition and stability of the image may be ensured, thereby improving detection accuracy.

According to the first aspect, in a possible implementation, the converter includes at least one DC/DC circuit, and one end of each DC/DC circuit is connected to the at least one photovoltaic string. The controlling, according to a backfeed instruction, the converter to enter a backfeed mode includes: controlling, according to the backfeed instruction, a DC/DC circuit connected to the selected photovoltaic string with the corresponding number to be in a bypass mode, so that energy of the power grid is transmitted to the selected photovoltaic string with the corresponding number by using the DC/DC circuit.

According to the first aspect, in a possible implementation, the converter includes at least one DC/DC circuit and at least one bypass switch, the DC/DC circuit and the bypass switch are equal in quantity and are in a one-to-one correspondence, and one end of each DC/DC circuit is connected to the at least one photovoltaic string. The controlling, according to a backfeed instruction, the converter to enter a backfeed mode includes: controlling, according to the backfeed instruction, a DC/DC connected to the selected photovoltaic string with the corresponding number to stop working, and controlling a bypass switch corresponding to the DC/DC circuit that stops working to be closed, to enable energy of the power grid to be transmitted to the selected photovoltaic string with the corresponding number by using the bypass switch.

According to the first aspect, in a possible implementation, the voltage limit includes a string current voltage. The determining a voltage limit in a process of determining the backfeed control voltage includes: in the process of determining the backfeed control voltage, periodically sampling currents of all photovoltaic strings to obtain a maximum sampling current of the photovoltaic strings; and calculating a difference between the maximum sampling current of the photovoltaic strings and a backfeed current safety threshold of the photovoltaic strings, and determining the string voltage limit by performing a proportional integral operation. In this way, protection may be prevented from being triggered due to insufficient connection or missing connection of the photovoltaic strings, thereby reducing a power loss of the system.

According to the first aspect, in a possible implementation, the voltage limit further includes a bypass switch voltage limit. The determining a voltage limit in a process of determining the backfeed control voltage further includes: in the process of determining the backfeed control voltage, periodically sampling currents of all bypass switches to obtain a maximum backfeed current of the bypass switches; and calculating a difference between the maximum backfeed current of the bypass switches and a backfeed current safety threshold of the bypass switches, and determining the bypass switch voltage limit by performing a proportional integral operation. In this way, the bypass switches may be prevented from being burnt out due to a very large current limit.

According to the first aspect, in a possible implementation, the power backfeed control method further includes: collecting a luminous image of the selected photovoltaic string under the electroluminescent effect, and performing fault detection on the photovoltaic string based on the image to identify a fault type of the photovoltaic string. In this way, EL backfeed control may be implemented for the photovoltaic string, and fault detection may be implemented for the photovoltaic string.

According to a second aspect, an embodiment of this application discloses a converter for a photovoltaic module. One end of the converter is connected to at least one photovoltaic string, and another end of the converter is connected to a power grid. Each photovoltaic string corresponds to one string number. The converter includes at least one DC/DC circuit, a sampling circuit, and a controller. One end of each DC/DC circuit is connected to the at least one photovoltaic string. The sampling circuit is electrically connected to the at least one DC/DC circuit, and is configured to sample a current of the photovoltaic string. The controller is electrically connected to the at least one DC/DC circuit and the sampling circuit separately, and is configured to control, according to a backfeed instruction, the converter to enter a backfeed mode. In the backfeed mode, the converter can transmit energy of the power grid to a selected photovoltaic string with a corresponding number. The controller is further configured to: determine a backfeed control voltage according to the backfeed instruction, and determine a voltage limit in a process of determining the backfeed control voltage; and further determine an actual backfeed voltage based on the backfeed control voltage and the voltage limit, where the actual backfeed voltage is a smaller one of the backfeed control voltage and the voltage limit. The controller is further configured to control the converter to output the actual backfeed voltage to the selected photovoltaic string, to enable the selected photovoltaic string to generate an electroluminescent effect.

According to the technical solution described in the second aspect, the controller further determines the voltage limit in the process of determining the backfeed control voltage, and uses the smaller one of the backfeed control voltage and the voltage limit as the actual backfeed voltage. In this way, problems of low detection efficiency and a power loss that are caused by frequent triggering of overcurrent protection due to an excessively high backfeed control voltage in a power backfeed control process can be avoided or reduced, to improve detection efficiency of the photovoltaic module and reduce a power loss of a photovoltaic power generation system.

According to the second aspect, in a possible implementation, the backfeed instruction includes a string number and a backfeed reference current. The controller is configured to control the converter to output a corresponding voltage to supply power to the photovoltaic string with the corresponding number. The sampling circuit is configured to sample a current of the photovoltaic string with the corresponding string number to obtain a feedback current. The controller is further configured to calculate a difference between the feedback current and the backfeed reference current, and determine the backfeed control voltage by performing proportional integral calculation.

According to the second aspect, in a possible implementation, the backfeed instruction includes a string number and a backfeed reference voltage. The controller is configured to: control the converter to output the backfeed reference voltage to supply power to the photovoltaic string with the corresponding number; adjust the backfeed reference voltage based on definition of a luminous image of the photovoltaic string with the corresponding number until the definition of the luminous image meets a preset requirement; and determine that a backfeed reference voltage when the preset requirement is met is the backfeed control voltage.

According to the second aspect, in a possible implementation, the controller controls, according to the backfeed instruction, a DC/DC circuit connected to the selected photovoltaic string with the corresponding number to be in a bypass mode, so that energy of the power grid is transmitted to the selected photovoltaic string with the corresponding number by using the DC/DC circuit, thereby enabling the converter to enter the backfeed mode.

According to the second aspect, in a possible implementation, the converter further includes at least one bypass switch, and the DC/DC circuit and the bypass switch are equal in quantity and are in a one-to-one correspondence. The controller controls, according to the backfeed instruction, a DC/DC connected to the selected photovoltaic string with the corresponding number to stop working, and controls a bypass switch corresponding to the DC/DC circuit that stops working to be closed, to enable energy of the power grid to be transmitted to the selected photovoltaic string with the corresponding number by using the bypass switch, thereby enabling the converter to enter the backfeed mode.

According to the second aspect, in a possible implementation, the voltage limit includes a string current voltage. In the process of determining the backfeed control voltage, the sampling circuit is configured to periodically sample currents of all photovoltaic strings to obtain a maximum sampling current of the photovoltaic strings. The controller is configured to calculate a difference between the maximum sampling current of the photovoltaic strings and a backfeed current safety threshold of the photovoltaic strings, and determine the string voltage limit by performing a proportional integral operation.

According to the second aspect, in a possible implementation, the voltage limit further includes a bypass switch voltage limit. In the process of determining the backfeed control voltage, the sampling circuit is configured to periodically sample currents of all bypass switches to obtain a maximum backfeed current of the bypass switches. The controller is configured to calculate a difference between the maximum backfeed current of the bypass switches and a backfeed current safety threshold of the bypass switches, and determine the bypass switch voltage limit by performing a proportional integral operation.

According to the second aspect, in a possible implementation, the controller is further configured to collect a luminous image of the selected photovoltaic string under the electroluminescent effect, and perform fault detection on the photovoltaic string based on the image to identify a fault type of the photovoltaic string.

According to a third aspect, an embodiment of this application discloses a photovoltaic power generation system, including at least one photovoltaic string and a power grid. The photovoltaic power generation system further includes the converter according to any one of the second aspect and the possible implementations of the second aspect. One end of the converter is connected to the at least one photovoltaic string, and another end of the converter is connected to the power grid.

According to a fourth aspect, an embodiment of this application discloses a computer-readable storage medium. The computer-readable storage medium stores a computer program, and the computer program includes at least one segment of code. The at least one segment of code may be executed by a computer, to control the computer to perform the method according to any one of the first aspect and the possible implementations of the first aspect.

DESCRIPTION OF EMBODIMENTS

This application provides a power backfeed control method and a converter that are for a photovoltaic module. The power backfeed control method is used to perform electroluminescent (EL) backfeed control on a photovoltaic string, to avoid or reduce problems of low detection efficiency and a power loss that are caused by frequent triggering of overcurrent protection due to an excessive backfeed current in a power backfeed control process, thereby improving detection efficiency of the photovoltaic string and reducing a power loss of a photovoltaic power generation system.

The following describes embodiments of this application with reference to accompanying drawings.

Figure 1:
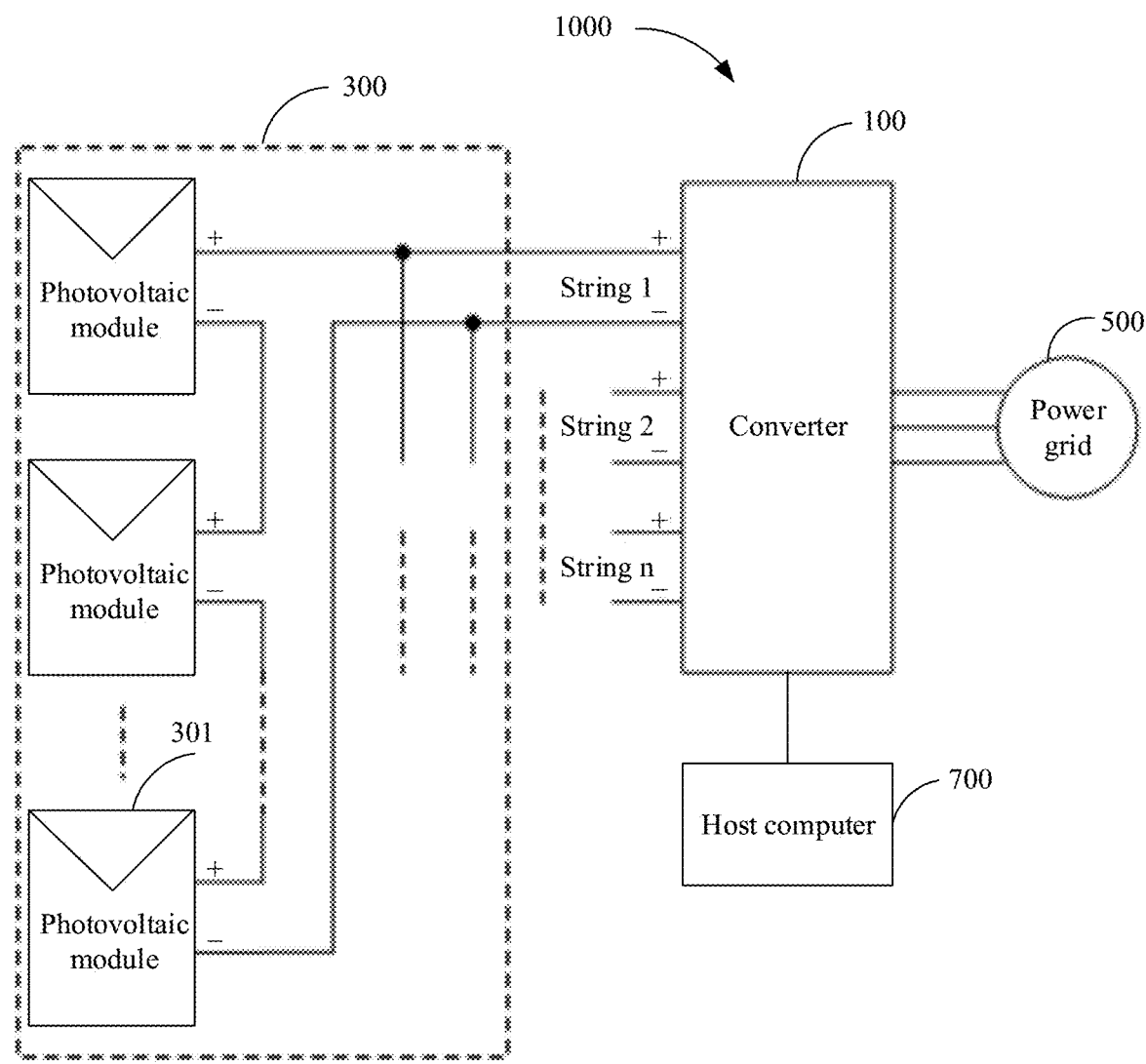
FIG. 1 is a schematic diagram of a structure of a photovoltaic power generation system according to an embodiment of this application.

FIG. 1 is a schematic diagram of a structure of a photovoltaic power generation system 1000 according to an embodiment of this application. The photovoltaic power generation system 1000 in this embodiment of this application may be applied to a large photovoltaic power station, a small or medium distributed power station, a household photovoltaic power generation system, or the like. This is not limited herein.

As shown in FIG. 1, the photovoltaic power generation system 1000 includes a converter 100, at least one photovoltaic string 300, a power grid 500, and a host computer 700. In this implementation, the photovoltaic string 300 includes a plurality of photovoltaic modules 301 combined in series and/or in parallel. In another embodiment, the photovoltaic string 300 may alternatively include only one photovoltaic module 301. The photovoltaic module 301 is also referred to as a solar panel, and is a core part in the photovoltaic power generation system. The photovoltaic module 301 converts solar energy into power, and provides direct current output, to be transmitted to a storage battery for storage or to drive a load to work.

It should be noted that a single solar cell cannot be directly used as a power supply, and single cells need to be connected in series and/or in parallel and tightly packed into a module, which is a smallest and indivisible photovoltaic cell combination apparatus. "A and/or B" in this application includes A and B, and A or B.

The converter 100 is connected to the at least one photovoltaic string 300, and is configured to convert output power of the photovoltaic string 300 connected to the converter 100. In this embodiment of this application, the converter 100 is a photovoltaic inverter, and may be further configured to convert a direct current that is output by the at least one photovoltaic string 300 into an alternating current, and then output the alternating current to the power grid 500. Specifically, the photovoltaic inverter may be a string inverter or a centralized inverter. In another embodiment, the converter 100 may alternatively be an optimizer, which is not limited herein, provided that power backfeed can be implemented on the photovoltaic string 300 connected to the converter 100.

In this embodiment of this application, a string inverter is used as an example for description. The string inverter is an inverter that uses two power conversion stages of direct current-direct current (DC/DC) and direct current-alternating current (DC/AC), and whose direct current side may be connected to a plurality of photovoltaic strings 300 that are not connected in parallel to each other.

The power grid 500 is also referred to as a power network, and includes a transformer substation and power transmission and distribution lines of various voltages in a power system, that is, three units of power transformation, power transmission, and power distribution, which are configured to transmit and distribute power and change a voltage.

The host computer 700 is configured to communicate with the converter 100. For example, the host computer 700 may send a power backfeed instruction to the converter 100, so that the converter 100 starts power backfeed control for the photovoltaic string 300. The host computer 700 may be an independent communications host, or may be a mobile terminal device. The host computer 700 may communicate with the converter 100 by using wireless communication (for example, Wi-Fi, LoRa, or ZigBee) or PLC communication.

It may be understood that the photovoltaic power generation system 1000 may include a plurality of converters 100, and an alternating current side of the converter 100 may be connected to a step-up transformer (not shown in the figure) and then to the power grid 500. Specifically, a quantity of converters 100 included in the photovoltaic power generation system 1000 and whether the alternating current side of the converter 100 is connected to a step-up transformer may be determined based on a specific application environment, and are not specifically limited herein.

It should be understood that the photovoltaic power generation system 1000 shown in FIG. 1 is merely an example. The photovoltaic power generation system in this embodiment of this application may alternatively include more or fewer apparatuses or devices. For example, the photovoltaic power generation system 1000 may alternatively not include the host computer 700.

Figure 2:
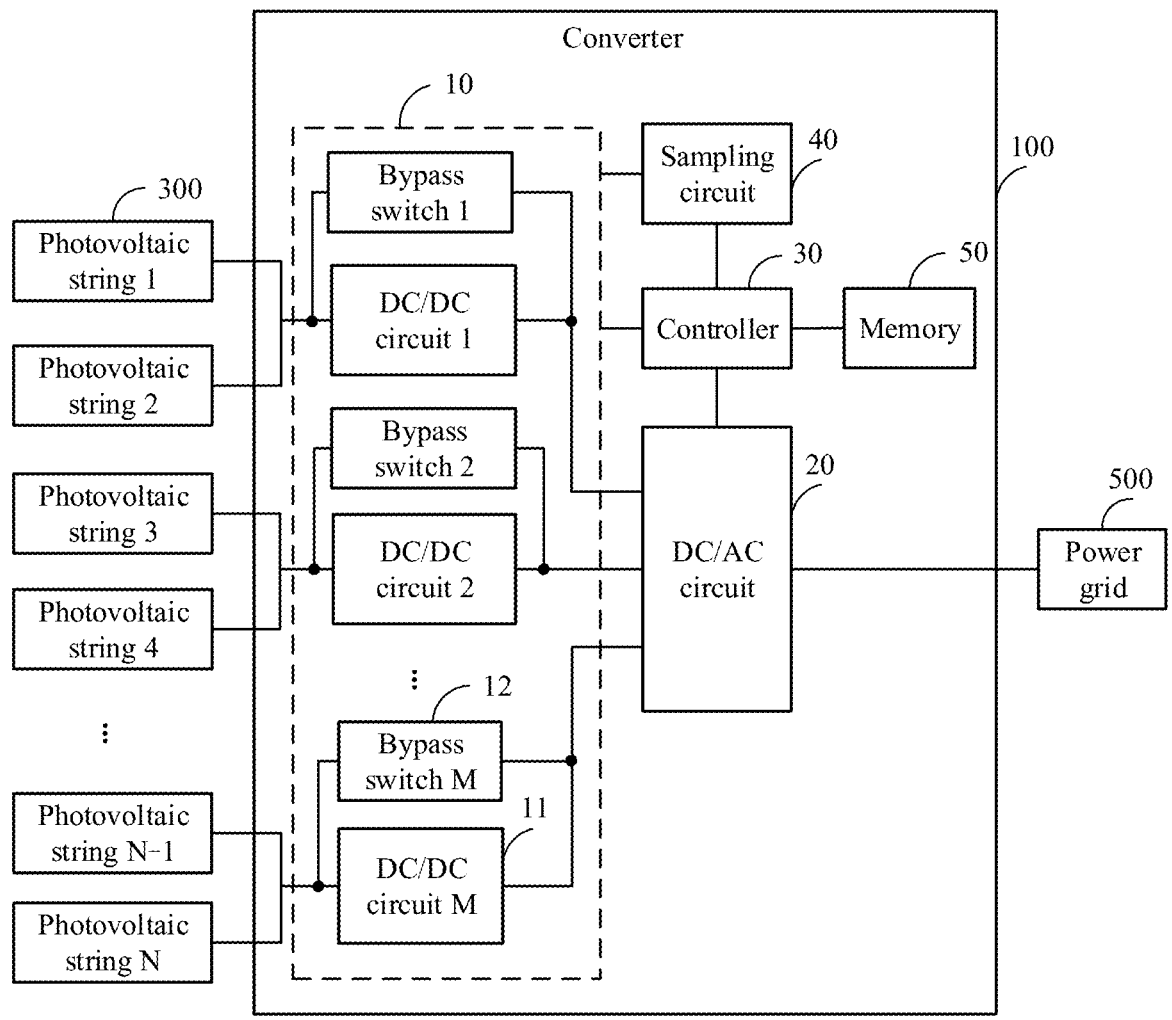
FIG. 2 is a principle block diagram of a converter according to an embodiment of this application.

FIG. 2 is a principle block diagram of a converter according to an embodiment of this application. As shown in FIG. 2, the converter 100 includes a power conversion circuit 10, an inverter (DC/AC) circuit 20, a controller 30, a sampling circuit 40, and a memory 50. Specifically, functions of the power conversion circuit 10, the DC/AC circuit 20, the controller 30, the sampling circuit 40, and the memory 50 may be implemented by using an integrated circuit. For example, the power conversion circuit 10, the DC/AC circuit 20, the controller 30, the sampling circuit 40, and the memory 50 are integrated to a PCB (printed circuit board, printed circuit board). The printed circuit board is also referred to as a printed line board, and is an important electronic component that is a support body for electronic components and a carrier for electrical connection of the electronic components.

Specifically, the power conversion circuit 10 includes a plurality of direct current-direct current (DC/DC) circuits 11 and a plurality of bypass switches 12. The plurality of bypass switches 12 and the plurality of DC/DC circuits 11 are equal in quantity and are in a one-to-one correspondence. Each DC/DC circuit 11 is connected to a plurality of photovoltaic strings 300. One end of the DC/AC circuit 20 is electrically connected to the plurality of DC/DC circuits 11, and another end of the DC/AC circuit 20 is electrically connected to a power grid 500. The bypass switch 12 may be a relay or another power switch (such as a triode), which is not limited herein.

It may be understood that, in some embodiments, the power conversion circuit 10 may include only one DC/DC circuit 11, and the one DC/DC circuit 11 is connected to a plurality of photovoltaic strings 300. In this implementation, each DC/DC circuit 11 is connected to two photovoltaic strings 300. In another embodiment, each DC/DC circuit 11 may alternatively be connected to more photovoltaic strings 300.

When the photovoltaic power generation system 1000 works in a power generation mode, the plurality of bypass switches 12 are in an opened state, and each DC/DC circuit 11 serves as an input end of the converter 100, and is configured to adjust an output voltage of the photovoltaic string 300. The DC/AC circuit 20 is configured to convert direct current power into alternating current power and input the alternating current power to the power grid 500.

In a specific embodiment, when the photovoltaic power generation system 1000 works in the power generation mode, the DC/DC circuit 11 may work in a power conversion mode, and is configured to perform power conversion on direct current power of the photovoltaic string 300 at an input end, and then output converted direct current power to an output end. Alternatively, the DC/DC circuit 11 may work in a bypass mode, in which the input end and the output end are directly connected. In specific actual application, circuit setting may be performed on the DC/DC circuit 11 based on a specific application environment. For example, a buck circuit, a boost circuit, a buck-boost circuit, or the like may be set.

The controller 30 is electrically connected to each DC/DC circuit 11, the DC/AC circuit 20, the sampling circuit 40, and the memory 50 separately. The controller 30 is a component capable of coordinating work of various components based on functional requirements of instructions, and is a nerve center and a command center of the system. The controller 30 generally includes three components: an instruction register (IR), a program counter (PC), and an operation controller (OC), which are very important for coordinating orderly work of the entire system. The controller 30 herein may be one or more devices, circuits, and/or processing cores configured to process data (for example, computer program instructions).

In another embodiment, the controller 30 may be a processor, or may be a general term of a plurality of processing elements. For example, the processor may be a general central processing unit (CPU), or may be an application-specific integrated circuit (ASIC), or one or more integrated circuits configured to control execution for a program of a solution of the present invention, for example, one or more micro-processors (e.g., digital signal processors (DSPs)) or one or more field programmable gate arrays (FPGAs). In a specific implementation, in an embodiment, the processor may include one or more CPUs.

The sampling circuit 40 is electrically connected to the power conversion circuit 10, and is configured to detect a voltage and a current of each photovoltaic string 300. In a specific actual application, the sampling circuit 40 may include a sensor, such as a current sensor.

The memory 50 may be a read-only memory (ROM) or another type of static storage device that can store static information and static instructions, or may be a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer. This is not limited thereto. The memory 50 may exist independently. The memory 50 may alternatively be integrated with the controller 30. The memory 50 may be configured to store data such as a current, a voltage, and power of the photovoltaic string 300.

It may be understood that a structure shown in this embodiment of this application does not constitute a specific limitation on the converter 100. In some other embodiments of this application, the converter 100 may include more or fewer components than those shown in the figure, or combine some components, or split some components, or have different component arrangements. The components shown in the figure may be implemented by using hardware, software, or a combination of software and hardware.

The photovoltaic string 300 is a core part of the solar power generation system, and quality of the photovoltaic string 300 directly determines power generation performance of the solar power generation system. Therefore, detection of the photovoltaic string 300 in the solar power generation system is an essential process. Currently, a common method for performing fault detection on the photovoltaic string 300 in the solar power generation system is an EL detection method. EL detection means that when a bias voltage is applied to and a backfeed current is injected into a photovoltaic module 301, the photovoltaic module 301 may be considered as a light emitting diode with relatively low light emitting efficiency, and may emit light to form an image with some brightness, that is, an EL image, and problems such as a hidden crack, a broken gate, and sintering of the photovoltaic module 301 may be found by detecting and analyzing the EL image.

In this embodiment of this application, the memory 50 is further configured to store application code for executing the solution of this application, and the controller 30 controls the execution. That is, the controller 30 is configured to invoke the application code stored in the memory 50, and perform the power backfeed control method in the embodiments of this application, to perform EL detection on the photovoltaic string 300.

Figure 3:
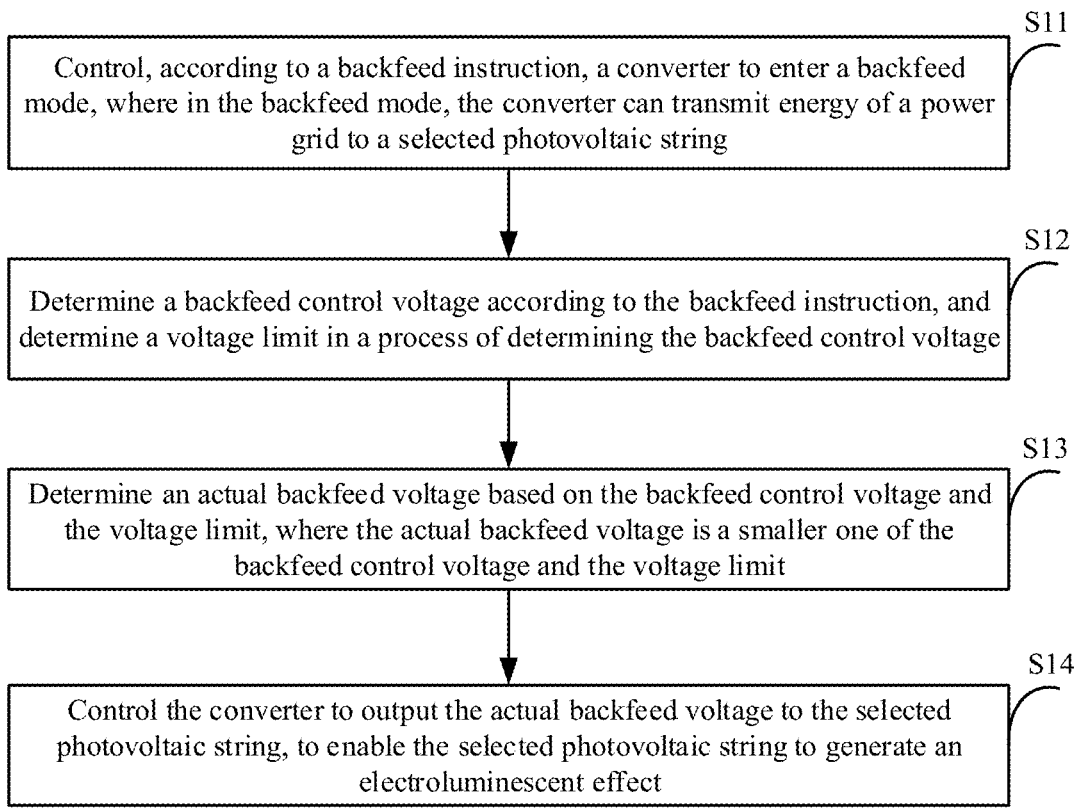
FIG. 3 is a flowchart of a power backfeed control method according to an embodiment of this application.

FIG. 3 is a flowchart of a power backfeed control method according to an embodiment of this application. The power backfeed control method is applied to the converter 100 shown in FIG. 2. Power backfeed refers to converting power of a power grid 500 into direct current power and then loading the direct current power to a photovoltaic string 300 (also referred to as "string" below) that needs to be detected. In this implementation, each photovoltaic string 300 corresponds to one string number, and the number is a numeral. In another implementation, the string number may alternatively be a letter, which is not limited herein, provided that each string may be distinguished from other strings. Specifically, the power backfeed control method specifically includes the following steps.

Step S11: Control, according to a backfeed instruction, the converter to enter a backfeed mode, where in the backfeed mode, the converter can transmit energy of the power grid to a selected photovoltaic string with a corresponding number.

The selected photovoltaic string 300 with the corresponding number is a photovoltaic string 300 on which EL detection needs to be performed. In this implementation, the backfeed instruction includes the string number of the selected photovoltaic string 300, and after receiving the backfeed instruction, the controller 30 controls a DC/DC circuit 11 connected to the selected photovoltaic string 300 with the corresponding number to stop working, and controls a bypass switch 12 corresponding to the DC/DC circuit 11 to be closed, so that a DC/AC circuit 20 is connected to the photovoltaic string 300 with the corresponding number by using the closed bypass switch 12. In this case, the DC/AC circuit 20 can convert alternating current power of the power grid 500 into direct current power, and then transmit the direct current power to the selected photovoltaic string 300 by using the selected bypass switch 12, so that the converter 100 is in the backfeed mode. In this way, a backfeed current value of the photovoltaic string 300 is controlled by controlling a voltage of a port that is of the converter 100 and that is connected to the photovoltaic string 300, so that the photovoltaic string 300 generates a stable EL image, thereby implementing an EL backfeed control technology.

Specifically, a plurality of photovoltaic strings 300 may be numbered, and the backfeed instruction includes the number corresponding to the selected photovoltaic string 300. For example, numbers of a plurality of photovoltaic strings 300 connected to the converter 100 are denoted by j, where j=1, 2, 3, . . . , and N, and N is a positive integer greater than or equal to 1. If the backfeed instruction includes numbers 2 and 3, it indicates that a photovoltaic string 2 and a photovoltaic string 3 need to be selected, and power backfeed needs to be performed on the photovoltaic string 2 and the photovoltaic string 3. According to the backfeed instruction, a DC/DC circuit 1 and a DC/DC circuit 2 that are connected to the photovoltaic string 2 and the photovoltaic string 3 are controlled to stop working, and a bypass switch 1 and a bypass switch 2 that are respectively selected from the DC/DC circuit 1 and the DC/DC circuit 2 are controlled to be closed, so that the converter 100 enters the backfeed mode.

It should be noted that, in this embodiment of this application, the backfeed instruction is sent by a host computer 700, and the converter 100 receives the backfeed instruction sent by the host computer 700, and performs a corresponding action according to the backfeed instruction. In another embodiment, the backfeed instruction may alternatively be obtained by the converter 100 based on an instruction entered by a user. For example, the user enters a corresponding instruction by using a touchscreen of the converter 100.

Step S12: Determine a backfeed control voltage according to the backfeed instruction, and determine a voltage limit in a process of determining the backfeed control voltage.

Figure 4:
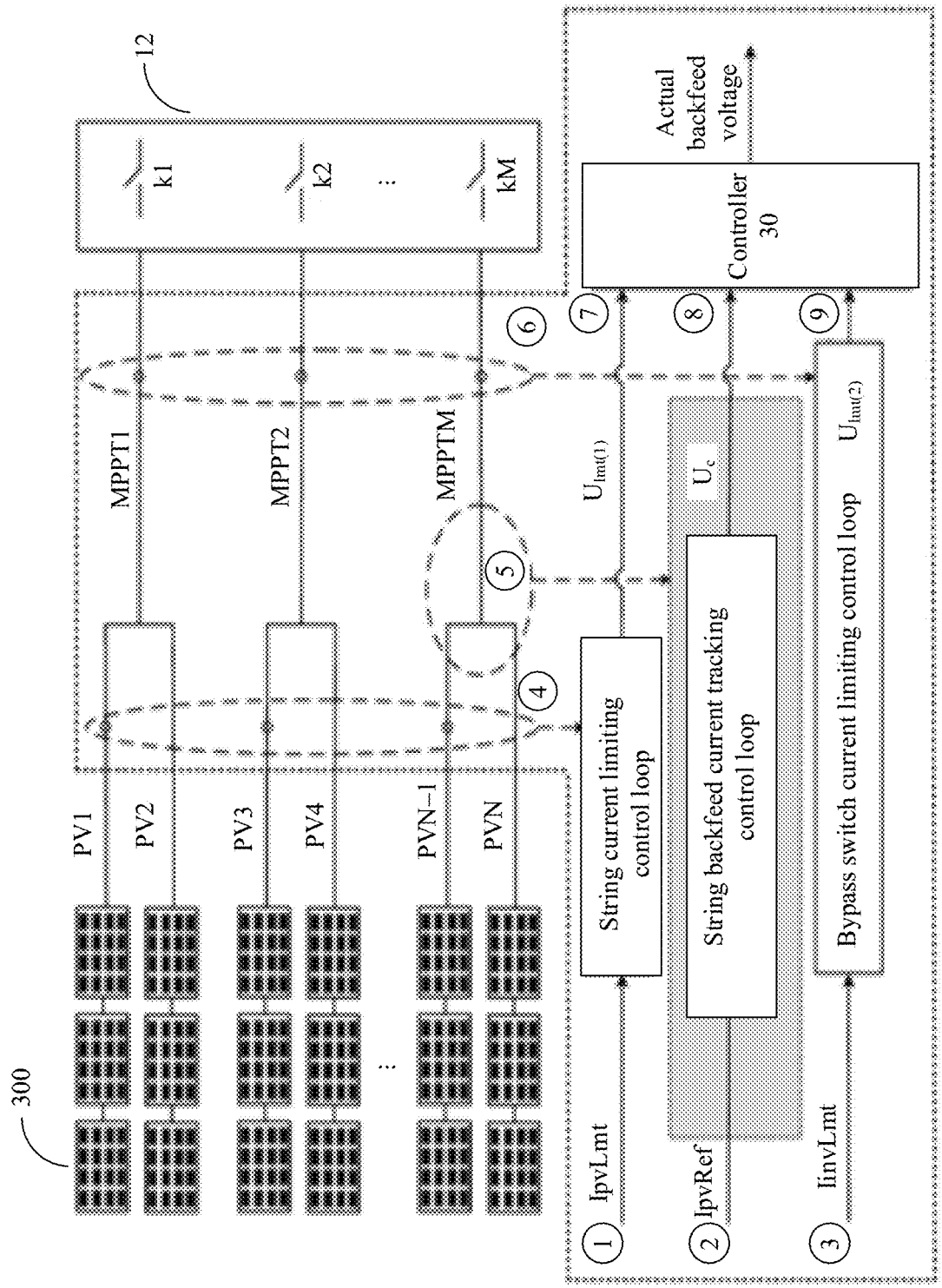
FIG. 4 is a schematic diagram of determining a control loop and an actual backfeed voltage according to an embodiment of this application.

Referring to FIG. 4, in some implementations, the backfeed instruction further includes a backfeed reference current. The determining an initial voltage according to the backfeed instruction includes: Based on the backfeed reference current $I_{ref(j)}$ and the string number j (where j=1, 2, 3, . . . , N, or multi-select), the DC/AC circuit 20 is controlled to output a corresponding voltage to supply power to the photovoltaic string 300 with the corresponding number, and a sampling circuit 40 is used to sample a current of the photovoltaic string 300 with the corresponding number to obtain a feedback current $I_{fbd(j)}$. The controller 30 calculates a difference $\Delta I_{(j)}$ between the feedback current $I_{fbd(j)}$ and the backfeed reference current $I_{ref(j)}$, and determines the backfeed control voltage $U_{c(j)}$ of a port of the selected string by performing proportional integral calculation. In this embodiment of this application, a control loop that determines the backfeed control voltage based on the backfeed reference current is referred to as a string backfeed current tracking control loop, and a main line used to output a voltage on a direct current side of the DC/AC circuit 20 is referred to as a bus of the converter.

Specifically, when a plurality of photovoltaic strings 300 are selected (multi-select), a backfeed reference current $I_{ref}$ of the string backfeed current tracking control loop should meet the following formula:

$$I_{ref} = \begin{cases} I_{ref}(j) \, j=1,2,3,\ldots,N \\ \sum_{j=l}^{k} I_{ref}(j) \, j \in [l,k] \end{cases}$$

Herein, $l \in [1, N-1]$, $k \in [2, N]$ and $l<k$. Both l and k are positive integers.

A feedback current $I_{fbd}$ of the string backfeed current tracking control loop should meet the following formula:

$$I_{fbd} = \begin{cases} I_{fbd}(j) \, j=1,2,3,\ldots,N \\ \sum_{j=l}^{k} I_{fbd}(j) \, j \in [l,k] \end{cases}$$

Herein, $l \in [1, N-1]$, $k \in [2, N]$ and $l<k$. Both l and k are positive integers.

That is, when a plurality of photovoltaic strings 300 are selected to perform power backfeed, the backfeed reference current of the string backfeed current tracking control loop should be a sum of backfeed reference currents of the plurality of selected strings. Similarly, the feedback current of the string backfeed current tracking control loop should also be a sum of feedback circuits of the plurality of selected strings. In this implementation, accuracy of the backfeed current can be ensured in this manner, so that definition and stability of the image are ensured, and accuracy of subsequent EL fault detection can be improved.

In another implementation, the backfeed instruction includes a backfeed reference voltage. The determining an initial voltage according to the backfeed instruction includes: Based on the backfeed reference voltage and the string number j (where j=1, 2, 3, . . . , N, or multi-select), the controller 30 controls a bus voltage of the converter to be adjusted to the backfeed reference voltage, adjusts the backfeed reference voltage based on definition of a luminous image of the photovoltaic string 300 with the corresponding number until the definition of the luminous image meets a preset requirement, and in this case, determines that a backfeed reference voltage when the preset requirement is met is the backfeed control voltage. That is, the backfeed reference voltage is directly used as a port voltage of the selected string, the bus voltage of the converter 100 is directly adjusted, and the backfeed reference voltage in the backfeed instruction is further adjusted by using the definition of the image of the photovoltaic string 300 with the corresponding number, until the image definition of the string meets a detection requirement.

It should be understood that, in a photovoltaic power station, when same power is supplied to the photovoltaic string 300, image quality generated by the string is different due to influence of external environmental factors (a temperature, a wind speed, and cloudy and rainy weather). That is, when the converter 100 provides the same power, the image quality may be better in an indoor environment, and the image quality is affected in an outdoor environment due to influence of an external environment. Therefore, adjusting the bus voltage of the converter based on the image definition of the string can ensure image definition and stability, and further improve the accuracy of subsequent EL fault detection.

The following describes in detail a method for determining the voltage limit in the process of determining the backfeed control voltage.

In this embodiment of this application, the voltage limit includes a string voltage limit and a bypass switch voltage limit. That is, when backfeed is performed on the selected photovoltaic string 300, whether overcurrent of another photovoltaic string 300 and a bypass switch 12 is caused by an excessive bus voltage of the converter further needs to be considered. For example, when power backfeed is performed on selected strings 2 and 3, because a string 1 and the string 2 are connected to a same DC/DC circuit 1, the bus voltage also performs power backfeed on the string 1 when performing power backfeed on the string 2. In this case, if insufficient connection or missing connection exists in the string 1, protection is triggered because a current of the string 1 exceeds a safety threshold. Similarly, when power backfeed is performed on the string 3, a similar situation occurs in a string 4.

Therefore, in some embodiments, to avoid occurrence of a situation in which protection is triggered because a current of any string exceeds the safety threshold, when power backfeed is performed on the selected string, currents of all strings 300 need to be periodically sampled to obtain a maximum sampling current of the photovoltaic strings 300, and a difference between the maximum sampling current of the photovoltaic strings 300 and a backfeed current safety threshold of the photovoltaic strings 300 is calculated, to determine the string voltage limit by performing a proportional integral operation. In this embodiment of this application, a loop for determining the string voltage limit is referred to as a string current limiting control loop.

Specifically, based on a string backfeed current safety preset value $I_{pv\_lmt}$, the string current limiting control loop periodically performs real-time traversal sampling to obtain a maximum backfeed current $I_{pv\_max}$ of N strings, calculates a difference $\Delta I$ between $I_{pv\_lmt}$ and $I_{pv\_max}$, and determines the string voltage limit $U_{lmt(1)}$ by using a proportional integral controller.

Similarly, to prevent the bypass switch 12 from being burnt out by a backfeed current exceeding a safety threshold of the bypass switch 12, in the process of determining the backfeed control voltage, currents of all bypass switches 12 further need to be periodically sampled to obtain a maximum backfeed current of the bypass switches 12, then a difference between the maximum backfeed current of the bypass switches 12 and a backfeed current safety threshold of the bypass switches 12 is calculated, and the bypass switch voltage limit is determined by performing a proportional integral operation. In this embodiment of this application, a loop for determining the bypass switch voltage limit is referred to as a bypass switch current limiting control loop.

Specifically, based on a backfeed current safety preset value $I_{mppt\_lmt}$ of the bypass switches 12, the bypass switch current limiting control loop periodically performs real-time traversal sampling to obtain a maximum backfeed current $I_{mppt\_max}$ of M bypass switches 12, calculates a difference $\Delta I$ between $I_{mppt\_lmt}$ and $I_{mppt\_max}$, and determines the bypass switch voltage limit $U_{lmt(2)}$ by using a proportional integral controller.

Step S13: Determine an actual backfeed voltage based on the backfeed control voltage and the voltage limit, where the actual backfeed voltage is a smaller one of the backfeed control voltage and the voltage limit.

Specifically, referring to FIG. 4 again, the string backfeed current tracking control loop determines a backfeed control voltage $U_c$ based on a backfeed reference current IpvRef, the string current limiting control loop determines a string voltage limit $U_{lmt(1)}$ based on a string current limit IpvLmt, and the bypass switch current limiting control loop determines a bypass switch voltage limit $U_{lmt(2)}$ based on a bypass switch current limit IinLmt. A smallest one of the three is selected by a multiple selector in the controller 30 through contention. Finally, the bus of the converter is controlled to output an actual backfeed voltage $U_{ref}$. Further, the converter controls the bus voltage to be $U_{ref}$ by performing pulse width modulation (PWM) rectification, to complete backfeed closed-loop control.

Step S14: Control the converter to output the actual backfeed voltage to the selected photovoltaic string, to enable the selected photovoltaic string to generate an electroluminescent effect.

The EL effect is a physical phenomenon in which an electric field is generated by a voltage applied to two electrodes of a material, and leads to a transition, a change, and recombination of electrons between energy levels, resulting in luminescence.

According to the power backfeed control method disclosed in this embodiment of this application, the voltage limit is further determined in the process of determining the backfeed control voltage, and the smaller one of the backfeed control voltage and the voltage limit is used as the actual backfeed voltage. In this way, problems of low detection efficiency and a power loss that are caused by frequent triggering of overcurrent protection due to an excessively high backfeed control voltage in a power backfeed control process can be avoided or reduced, to improve detection efficiency of the photovoltaic module and reduce a power loss of a photovoltaic power generation system. In addition, the bypass switches 12 may be prevented from being burnt out due to an excessive current.

Figure 5A:
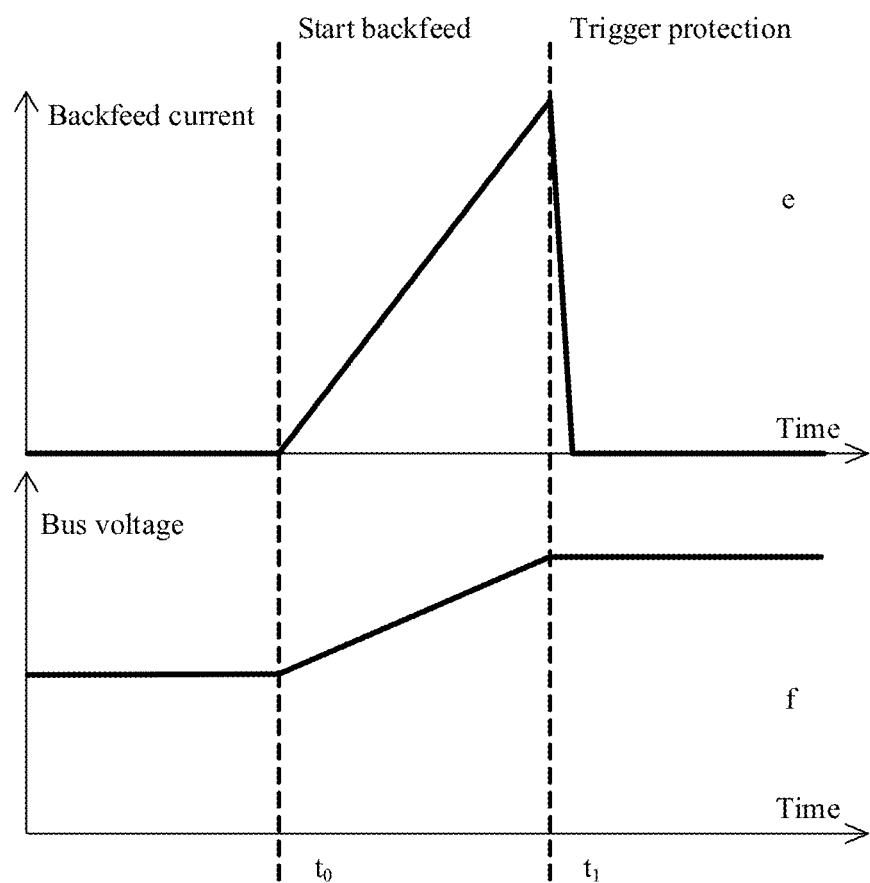
FIG. 5a is a schematic diagram of a power backfeed effect in a conventional technology.
Figure 5B:
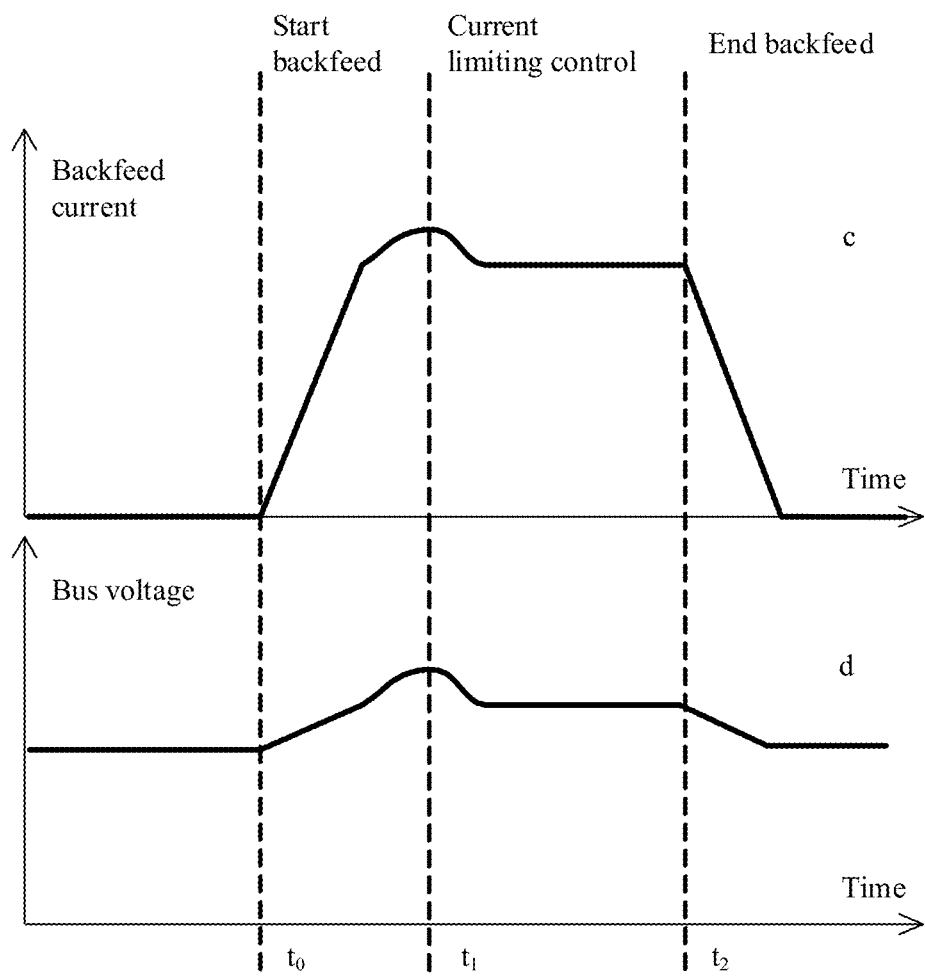
FIG. 5b is a schematic diagram of a power backfeed effect according to an embodiment of this application.

FIG. 5a is a schematic diagram of a power backfeed effect in a conventional technology, and FIG. 5b is a schematic diagram of a power backfeed effect according to an embodiment of this application. Channels e and c are backfeed current waveforms, and channels f and d are bus voltage waveforms. It may be learned from FIG. 5a that, in the conventional technology, backfeed control is started at a moment to, and if missing connection or insufficient connection exists in a string, when a bus voltage of a converter is controlled to implement current backfeed on a single or plurality of strings, another string connected to a bus may be out of control at a moment ti, leading to a problem of an excessive current. Frequent overcurrent protection causes a bypass switch 12 to be opened, thereby interrupting backfeed, affecting overall detection efficiency, and causing a power loss problem and even a risk of module burnout.

According to the power backfeed method in this embodiment, when backfeed current closed-loop tracking control is ensured, a string current limiting control loop exits saturation at a moment ti in FIG. 5b when any string current of N string currents exceeds a specification allowable value. The bus of the converter uses a string voltage limit as an actual backfeed voltage, and the bus voltage gradually decreases from a current value, so that an output voltage of the string current limiting control loop succeeds in contention. After a steady state is reached, a maximum value of the N string currents is ensured to be close to a safety preset value. Similarly, a bypass switch current limiting control loop exits saturation when any one of currents of M bypass switches 12 exceeds a specification allowable value. The bus of the converter uses a bypass switch voltage limit as an actual backfeed voltage, and the bus voltage gradually decreases from a current value, so that an output voltage of the bypass switch current limiting control loop succeeds in contention. After a steady state is reached, a maximum value of M component currents is kept close to a safety preset value.

Figure 6:
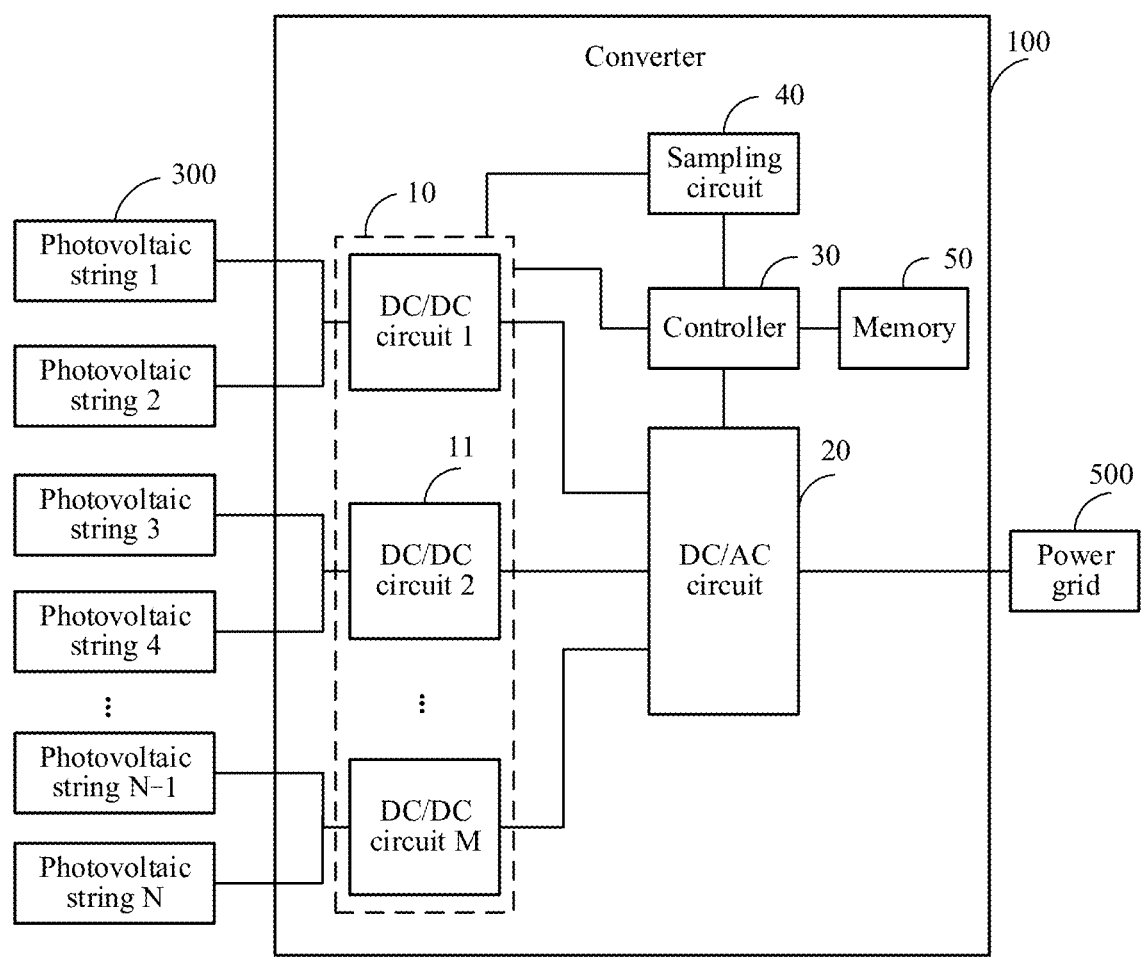
FIG. 6 is a principle block diagram of a converter according to another embodiment of this application.

FIG. 6 is a principle block diagram of a converter according to another embodiment of this application. In this implementation, because the DC/DC circuit 11 has a reverse electricity transmission function, the bypass switch 12 may be omitted. Therefore, in this implementation, when the backfeed mode is entered according to the backfeed instruction in step S11, the controller 30 controls the DC/DC circuit 11 connected to the photovoltaic string 300 to connect the photovoltaic string 300 and the DC/AC circuit 20, that is, controls the DC/DC circuit 11 to work in the bypass mode, so that the converter 100 is in the backfeed mode. In this case, the DC/AC circuit 20 can convert alternating current power of the power grid 500 into direct current power, and then transmit the direct current power to the selected photovoltaic string 300 by using the DC/DC circuit 11. In addition, the voltage limit in step S12 may include only the string voltage limit. Others are the same as the method steps shown in FIG. 3.

Figure 7:
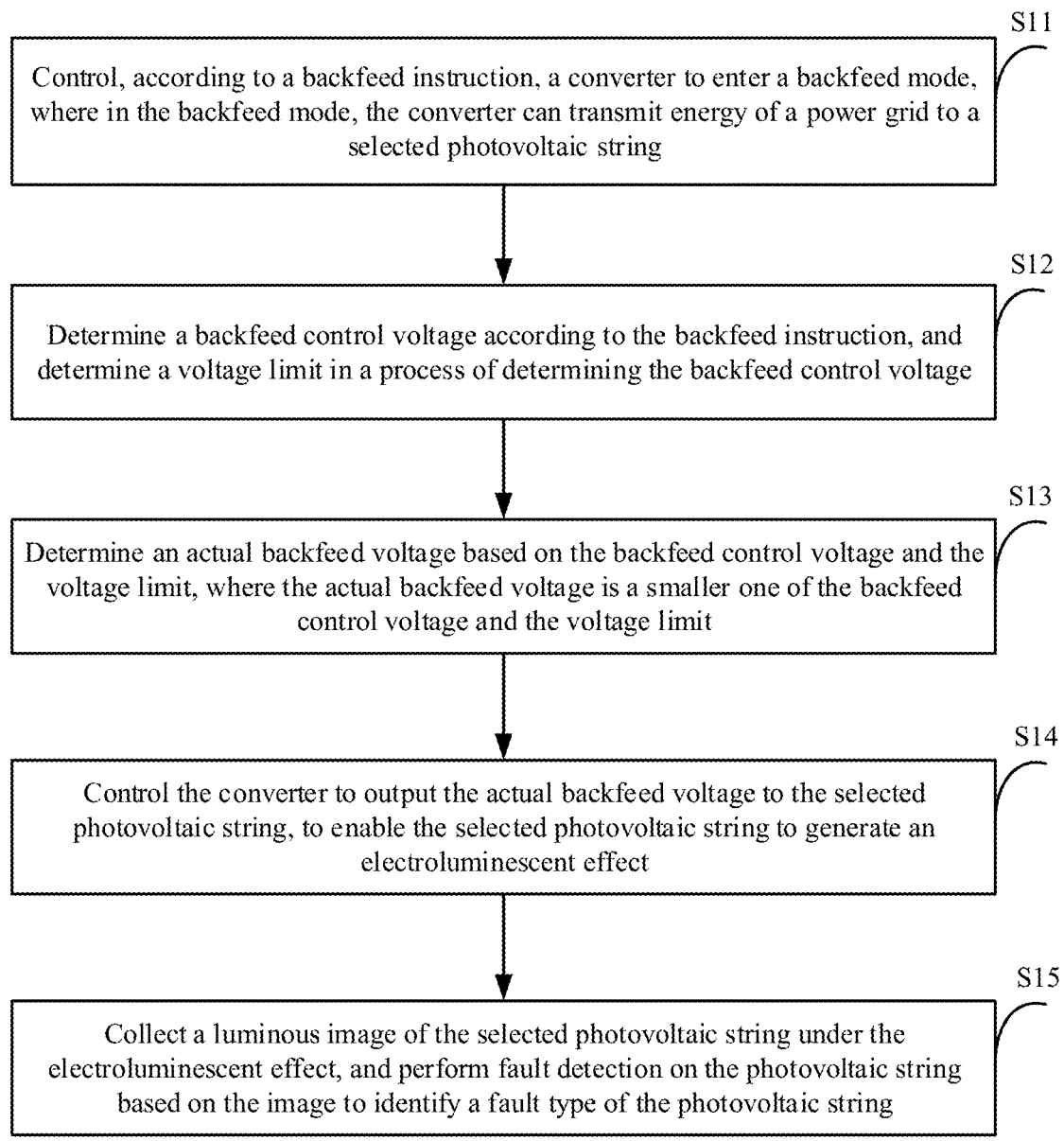
FIG. 7 is a flowchart of a power backfeed control method according to another embodiment of this application.

FIG. 7 is a flowchart of a power backfeed control method according to another embodiment of this application. Different from the power backfeed control method in FIG. 3, the power backfeed control method further includes the following step:

Step S15: Collect a luminous image of the selected photovoltaic string under the electroluminescent effect, and perform fault detection on the photovoltaic string based on the image to identify a fault type of the photovoltaic string.

In this way, fault detection on the string may be implemented by performing this step. Types of faults that greatly affect a power generation capacity include: a module open circuit, a module failure, a module diode short circuit, module proportional-integral-derivative (PID) attenuation, module electrical performance mismatch (inconsistent module electrical performance due to attenuation, irradiation, or the like), a module hidden crack, broken glass, module internal resistance abnormality (aging, falling off, or the like of a solder busbar), and the like.

The embodiments in this specification are all described in a progressive manner, for same or similar parts in the embodiments, refer to these embodiments, and each embodiment focuses on a difference from another embodiment. The method disclosed in the embodiments corresponds to the apparatus disclosed in the embodiments, and therefore is briefly described. For related parts, refer to the description of the apparatus.

It should be noted that, for brief description, the foregoing method embodiments are represented as a series of actions. However, a person skilled in the art should appreciate that this application is not limited to the described order of the actions. According to this application, some steps may be performed in another order or simultaneously.

A sequence of the steps of the method in the embodiments of this application may be adjusted, combined, or removed based on an actual requirement.

The power backfeed control method for the photovoltaic module provided in this application may be implemented in hardware and firmware, or may be used as software or computer code that can be stored in a computer-readable storage medium, for example, a read-only memory (ROM), a random access memory (RAM), a floppy disk, a hard disk, or a magneto-optical disk, or may be used as computer code that can be originally stored in a remote recording medium or a non-transitory machine-readable medium, downloaded over a network, and stored in a local recording medium. Therefore, the method described herein may be presented, by using a general-purpose computer or a special processor, or in programmable or dedicated hardware such as an application-specific integrated circuit (ASIC) or a field programmable gate array (FPGA), as software stored in a recording medium. As can be understood in the art, a computer, a processor, a microprocessor, a controller, or programmable hardware includes a memory component, for example, a RAM, a ROM, or a flash memory. When the computer, the processor, or the hardware implements the processing method described herein to access and execute software or computer code, the memory component may store or receive the software or the computer code. Moreover, when the general-purpose computer accesses code for performing the processing shown herein, execution of the code converts the general-purpose computer to a special-purpose computer for performing the processing shown herein.

The computer-readable storage medium may be a solid-state memory, a memory card, an optical disc, or the like. The computer-readable storage medium stores program instructions for the converter of the photovoltaic module in this application to execute the foregoing power backfeed control method for the photovoltaic module.

The foregoing description is merely a specific implementation of the present invention, but is not intended to limit the protection scope of the present invention. Any variation or replacement readily figured out by the person skilled in the art within the technical scope disclosed in the present invention shall fall within the protection scope of the present invention. Therefore, the protection scope of the present invention shall be subject to the protection scope of the claims.

What is claimed is:

1. A power backfeed control method, applied to a converter, wherein one end of the converter is connected to at least one photovoltaic string, and another end of the converter is connected to a power grid, each photovoltaic string corresponds to one string number, and the power backfeed control method comprising:
    controlling, according to a backfeed instruction, the converter to enter a backfeed mode, wherein in the backfeed mode, the converter can transmit energy of the power grid to a selected photovoltaic string with a corresponding number;
    determining a backfeed control voltage according to the backfeed instruction, and determining a voltage limit in a process of determining the backfeed control voltage;
    determining an actual backfeed voltage based on the backfeed control voltage and the voltage limit, wherein the actual backfeed voltage is a smaller one of the backfeed control voltage and the voltage limit; and
    controlling the converter to output the actual backfeed voltage to the selected photovoltaic string to enable the selected photovoltaic string to generate an electroluminescent effect.

2. The power backfeed control method according to claim 1, wherein the backfeed instruction comprises a string number and a backfeed reference current, and the determining a backfeed control voltage according to the backfeed instruction comprises:
    controlling the converter to output a corresponding voltage to supply power to the photovoltaic string with the corresponding number;
    sampling a current of the photovoltaic string with the corresponding string number to obtain a feedback current; and
    calculating a difference between the feedback current and the backfeed reference current, and determining the backfeed control voltage by performing a proportional integral calculation.

3. The power backfeed control method according to claim 1, wherein the backfeed instruction comprises a string number and a backfeed reference voltage, and the determining a backfeed control voltage according to the backfeed instruction comprises:
    controlling the converter to output the backfeed reference voltage to supply power to the photovoltaic string with the corresponding number;
    adjusting the backfeed reference voltage based on definition of a luminous image of the photovoltaic string with the corresponding number until the definition of the luminous image meets a preset requirement; and
    determining that the backfeed reference voltage is the backfeed control voltage based on the preset requirement being met.

4. The power backfeed control method according to claim 1, wherein the converter comprises at least one DC/DC circuit, and one end of each DC/DC circuit is connected to the at least one photovoltaic string, and the controlling, according to the backfeed instruction, the converter to enter the backfeed mode comprises:
    controlling, according to the backfeed instruction, a DC/DC circuit connected to the selected photovoltaic string with the corresponding number to be in a bypass mode, to enable energy of the power grid to be transmitted to the selected photovoltaic string with the corresponding number by using the DC/DC circuit.

5. The power backfeed control method according to claim 1, wherein the converter comprises at least one DC/DC circuit and at least one bypass switch, the at least one DC/DC circuit and the at least one bypass switch are equal in quantity and are in a one-to-one correspondence, and one end of each DC/DC circuit is connected to the at least one photovoltaic string; and the controlling, according to a backfeed instruction, the converter to enter a backfeed mode comprises:
    controlling, according to the backfeed instruction, a DC/DC circuit connected to the selected photovoltaic string with the corresponding number to stop working, and controlling a bypass switch corresponding to the DC/DC circuit that stops working to be closed, to enable energy of the power grid to be transmitted to the selected photovoltaic string with the corresponding number by using the bypass switch.

6. The power backfeed control method according to claim 1, wherein the voltage limit comprises a string current voltage, and the determining a voltage limit in a process of determining the backfeed control voltage comprises:
    in the process of determining the backfeed control voltage, periodically sampling currents of all photovoltaic strings to obtain a maximum sampling current of the photovoltaic strings; and
    calculating a difference between the maximum sampling current of the photovoltaic strings and a backfeed current safety threshold of the photovoltaic strings, and determining the string voltage limit by performing a proportional integral operation.

7. The power backfeed control method according to claim 6, wherein the voltage limit further comprises a bypass switch voltage limit, and the determining a voltage limit in a process of determining the backfeed control voltage further comprises:

in the process of determining the backfeed control voltage, periodically sampling currents of all bypass switches to obtain a maximum backfeed current of all the bypass switches; and calculating a difference between the maximum backfeed current of all the bypass switches and a backfeed current safety threshold of all the bypass switches, and determining the bypass switch voltage limit by performing a proportional integral operation.

8. The power backfeed control method according to claim 1, wherein the power backfeed control method further comprises:

collecting a luminous image of the selected photovoltaic string under the electroluminescent effect; and performing fault detection on the photovoltaic string based on the image to identify a fault type of the photovoltaic string.

9. A converter, wherein one end of the converter is connected to at least one photovoltaic string, and another end of the converter is connected to a power grid, each photovoltaic string corresponds to one string number, and the converter comprises:

at least one DC/DC circuit, wherein one end of each DC/DC circuit is connected to the at least one photovoltaic string;

a sampling circuit, electrically connected to the at least one DC/DC circuit, and configured to sample a current of the photovoltaic string; and a controller, electrically connected to the at least one DC/DC circuit and the sampling circuit separately, and configured to control, according to a backfeed instruction, the converter to enter a backfeed mode, wherein in the backfeed mode, the converter can transmit energy of the power grid to a selected photovoltaic string with a corresponding number, wherein:

the controller is further configured to:
determine a backfeed control voltage according to the backfeed instruction, and determine a voltage limit in a process of determining the backfeed control voltage;

determine an actual backfeed voltage based on the backfeed control voltage and the voltage limit, wherein the actual backfeed voltage is a smaller one of the backfeed control voltage and the voltage limit; and control the converter to output the actual backfeed voltage to the selected photovoltaic string, to enable the selected photovoltaic string to generate an electroluminescent effect.

10. The converter according to claim 9, wherein the backfeed instruction comprises a string number and a backfeed reference current, the controller is configured to control the converter to output a corresponding voltage to supply power to the photovoltaic string with the corresponding number, the sampling circuit is configured to sample a current of the photovoltaic string with the corresponding string number to obtain a feedback current, and the controller is further configured to: calculate a difference between the feedback current and the backfeed reference current, and determine the backfeed control voltage by performing a proportional integral calculation.

11. The converter according to claim 9, wherein the backfeed instruction comprises a string number and a backfeed reference voltage, and the controller is further configured to:

control the converter to output the backfeed reference voltage to supply power to the photovoltaic string with the corresponding number;

adjust the backfeed reference voltage based on definition of a luminous image of the photovoltaic string with the corresponding number until the definition of the luminous image meets a preset requirement; and determine that the backfeed reference voltage is the backfeed control voltage based on the preset requirement being met.

12. The converter according to claim 9, wherein the controller controls, according to the backfeed instruction, a DC/DC circuit connected to the selected photovoltaic string with the corresponding number to be in a bypass mode, to enable energy of the power grid to be transmitted to the selected photovoltaic string with the corresponding number by using the DC/DC circuit, to further enable the converter to enter the backfeed mode.

13. The converter according to claim 9, wherein the converter further comprises at least one bypass switch, and the at least one DC/DC circuit and the at least one bypass switch are equal in quantity and are in a one-to-one correspondence; and wherein the controller controls, according to the backfeed instruction, a DC/DC circuit connected to the selected photovoltaic string with the corresponding number to stop working, and controls a bypass switch corresponding to the DC/DC circuit that stops working to be closed, to enable energy of the power grid to be transmitted to the selected photovoltaic string with the corresponding number by using the bypass switch, to further enable the converter to enter the backfeed mode.

14. The converter according to claim 9, wherein the voltage limit comprises a string current voltage, and in the process of determining the backfeed control voltage, the sampling circuit is configured to periodically sample currents of all photovoltaic strings to obtain a maximum sampling current of all the photovoltaic strings; and wherein the controller is further configured to:
calculate a difference between the maximum sampling current of all the photovoltaic strings and a backfeed current safety threshold of all the photovoltaic strings, and determine the string voltage limit by performing a proportional integral operation.

15. The converter according to claim 14, wherein the voltage limit further comprises a bypass switch voltage limit, and in the process of determining the backfeed control voltage, the sampling circuit is configured to periodically sample currents of all bypass switches to obtain a maximum backfeed current of all the bypass switches; and wherein the controller is further configured to:
calculate a difference between the maximum backfeed current of all the bypass switches and a backfeed current safety threshold of all the bypass switches, and determine the bypass switch voltage limit by performing a proportional integral operation.

16. The converter according to claim 9, wherein the controller is further configured to collect a luminous image of the selected photovoltaic string under the electroluminescent effect, and perform fault detection on the photovoltaic string based on the image to identify a fault type of the photovoltaic string.

17. A photovoltaic power generation system comprising:
at least one photovoltaic string;
a power grid; and
a converter, wherein one end of the converter is connected to the at least one photovoltaic string, and another end of the converter is connected to the power grid, each photovoltaic string corresponds to one string number, and the converter comprises:
at least one DC/DC circuit, wherein one end of each DC/DC circuit is connected to the at least one photovoltaic string;
a sampling circuit, electrically connected to the at least one DC/DC circuit, and configured to sample a current of the photovoltaic string; and
a controller, electrically connected to the at least one DC/DC circuit and the sampling circuit separately, and configured to control, according to a backfeed instruction, the converter to enter a backfeed mode, wherein in the backfeed mode, the converter can transmit energy of the power grid to a selected photovoltaic string with a corresponding number, wherein the controller is further configured to:
determine a backfeed control voltage according to the backfeed instruction, and determine a voltage limit in a process of determining the backfeed control voltage;
determine an actual backfeed voltage based on the backfeed control voltage and the voltage limit, wherein the actual backfeed voltage is a smaller one of the backfeed control voltage and the voltage limit; and
control the converter to output the actual backfeed voltage to the selected photovoltaic string, to enable the selected photovoltaic string to generate an electroluminescent effect.

18. The photovoltaic power generation system according to claim 17, wherein the backfeed instruction comprises a string number and a backfeed reference current, the controller is configured to control the converter to output a corresponding voltage to supply power to the photovoltaic string with the corresponding number, the sampling circuit is configured to sample a current of the photovoltaic string with the corresponding string number to obtain a feedback current, and the controller is further configured to: calculate a difference between the feedback current and the backfeed reference current, and determine the backfeed control voltage by performing a proportional integral calculation.

19. The photovoltaic power generation system according to claim 17, wherein the backfeed instruction comprises a string number and a backfeed reference voltage, and the controller is further configured to:
control the converter to output the backfeed reference voltage to supply power to the photovoltaic string with the corresponding number;
adjust the backfeed reference voltage based on definition of a luminous image of the photovoltaic string with the corresponding number until the definition of the luminous image meets a preset requirement; and
determine that the backfeed reference voltage is the backfeed control voltage based on the preset requirement being met.

20. The photovoltaic power generation system according to claim 17, wherein the controller controls, according to the backfeed instruction, a DC/DC circuit connected to the selected photovoltaic string with the corresponding number to be in a bypass mode, to enable energy of the power grid to be transmitted to the selected photovoltaic string with the corresponding number by using the DC/DC circuit, to further enable the converter to enter the backfeed mode.

* * * * *